April 2, 1968 W. E. FLANNERY 3,376,520

THIN MAGNETIC FILM IMPEDANCE TRANSFORMER

Filed May 31, 1963

INVENTOR
WILLIAM E. FLANNERY

BY J. Donald Weber, Jr.
AGENT

United States Patent Office 3,376,520

Patented Apr. 2, 1968

3,376,520

THIN MAGNETIC FILM IMPEDANCE TRANSFORMER

William E. Flannery, Norristown, Pa., assignor to Sperry Rand Corporation, New York, N.Y., a corporation of Delaware Filed May 31, 1963, Ser. No. 284,408
6 Claims. (Cl. 333—34)

This invention relates to an impedance transformer. More particularly, the subject impedance transformer utilizes a thin magnetic film to control the change in the impedance thereof.

It is well known in the electronic industry and related fields, that there are many instances wherein certain components, circuits, networks, or the like, require impedance matching therebetween. This impedance matching may be required for many reasons as for example in order to eliminate reflections of current or similar signals. However, it is not always possible to provide components, circuits, or networks which have identical or substantially compatible input and output impedance values. Therefore, impedance matching devices, often called impedance transformers, are provided.

In the past, typical impedance transformers comprised coaxial cables, transmission lines or similar types of devices. However, these devices normally require some type of exponentially varying dimensions or parameters. Such devices are, of course, difficult to produce. Moreover, many of these devices are bulky and require large physical dimensions to provide the necessary impedance transformation or matching. Since the present trend in the electronic art is toward smaller and smaller sizes, as for example microminiaturization and the like, such physically large impedance transformers are often-times undesirable.

The instant impedance transformer may be constructed in exceedingly small sizes and yet provide impedance transformations which are considerable in magnitude. Basically, the invention comprises a pair of conductors arranged in a transmission-line or strip-line configuration. A thin magnetic film exhibiting uniaxial anisotropy is sandwiched between the conductors to vary the impedance therebetween. For practical purposes, other materials such as dielectric spacers (insulators) and/or binding materials are included within the sandwich between the conducting transmission lines.

Thus, it is one object of this invention to provide a thin magnetic film impedance transformer.

Another object of this invention is to provide an impedance transformer which utilizes a thin magnetic film having a variable $H_k$ value.

Another object of this invention is to provide an impedance transformer which is useful in the UHF region.

Another object of this invention is to provide an impedance transformer which has relatively simple physical and geometrical properties.

Another object of this invention is to provide an impedance transformer which has relatively small physical dimensions.

Another object of this invention is to provide an impedance transformer which eliminates the problems of signal reflections on the line used to connect circuit components.

Figure 1:
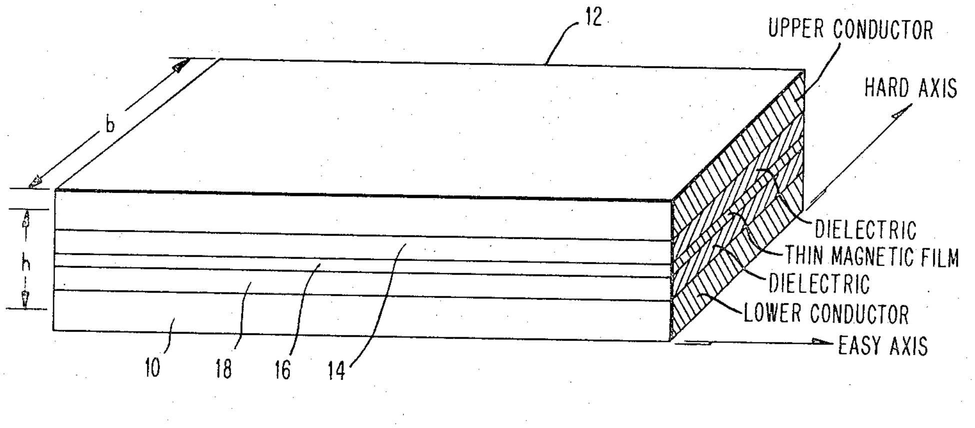
Figure 2:
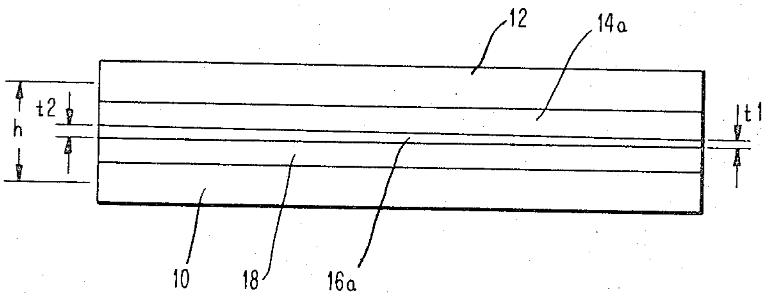

These and other objects and advantages of this invention will become more readily apparent when the following description is read in conjunction with the drawings attached hereto, in which:

FIGURE 1 is a schematic diagram of a perspective view of one embodiment of the invention; and FIGURE 2 is a schematic diagram of a side view of a second embodiment of the invention.

Referring now to FIGURE 1, there is shown a perspective view of one embodiment of the instant invention. In this embodiment, a lower conductor 10, such as a ground plane in a printed circuit board or the like, may be used. The conductor 10 may be any typical conducting type material as for example copper or the like. Depending upon the type of construction desired, the conductor 10 may be a copper layer on the order of several mils thick which is on the lower or bottom side of a printed circuit board as for example 18. The layer 18 is a dielectric layer. This dielectric may be any type of insulating material as for example glass or epoxy-glass or the like and may be several mils thick. These suggested materials may be utilized if the printed circuit board technique suggested supra is utilized. If, however, the lower conductor 10 is merely one of the conductors (again several mils thick) of the transmission line and is actually supported on another relatively large base material (not shown), the layer 18 may in fact comprises any type of insulating layer as for example $Al_2O_3$ or SiO which layer is on the order of 2,000 Angstroms thick. The layer 16 comprises a thin magnetic film as for example 81 Permalloy which is an Ni·Fe compound. This magnetic film is on the order of 5000 Angstroms, or less, in thickness. The layer 14 is another dielectric and may be similar to layer 18. However, it is also contemplated that layer 14 (or layer 18 alternatively) may comprise a base-substrate upon which the thin magnetic film layer 16 is applied. The upper conductor 12, which is similar to conductor 10, is adjacent to the layer 14 and completes the transmission line with conductor 10.

The thin magnetic film 16 provides the controlling component of the device and the layers 14 and 18 provide the insulating or dielectric material between the conductors 10 and 12. It is to be understood, of course, that if desirable, certain bonding materials as for example gold or the like may be interposed between the several layers in order to facilitate the bonding quality therebetween. This bonding technique is known in the art.

In this device, it is critical to understand that the thin magnetic film 16 must be a film which exhibits uniaxial anisotropy. Thus, this film has an EASY magnitigation axis thereof as well as a HARD magnetization axis. In the fabrication of the device, it is important that the EASY axis of the film be aligned with the direction of the propagation of the signals through the impedance transformer. Similarly, the HARD axis of the thin magnetic film must be aligned normal, or perpendicular, to the direction of propagation of the signal through the transmission line. Thus, when a signal is applied to the transmission line, the transmision line operates in the TEM mode whereby the magnetic vector of the field produced by the signals applied to the conductors is parallel to the HARD axis of the thin magnetic film. This characteristic has the effect of producing a closed hysteresis characteristic for the thin magnetic film whereby the hysteresis characteristic between the positive and negative saturation regions is substantially linear. This type of hysteresis characteristic provides for improved operation of the transformer.

The characteristic impedance of the strip transmission line shown in FIGURE 1 may be computed from the equation $$Z_0=377\frac{h}{b}\sqrt{\frac{\mu_r}{e_r}}$$

In this equation, $Z_0$, represents the characteristic impedance of the transmission line; $h$, represents the distance between the centers of the conductors; $b$, represents the width of the transmision line; $\mu_r$ is the relative permeability of the material between the conductors of the transmision line; and, $e_r$, is the relative dielectric constant of the material between the transmission lines. Thus, it may be seen that the characteristic impedance of the transmission line, assuming constant physical dimensions, will vary in accordance with the variation in the dielectric constant or the permeability of the material between the transmission lines. If it is assumed that the dielectric constant of the material remains constant (which is a reasonable asumption), it will be seen that the variation in $Z_0$ is a function of a variation in the relative permeability, $\mu_r$.

For the type of film discussed, supra, having a uniaxial anisotropy, the slope of the linear portion of the B–H characteristic in the HARD direction may be defined as the permeability of the film. That is, $$\mu=\frac{B_s}{H_k}$$

In this equation, $B_s$ is the saturation field and $H_k$ is the anisotropy field for the film. Since the field $B_s$ may be substantially constant, for example at approximately 10,000 gauss, a variation in $\mu$ is obtained by a variation in $H_k$. Thus, by utilizing a thin magnetic film 16 which has a uniformly varying $H_k$ along the length thereof, it will be seen that the impedance of the transmision line transformer will vary along the length thereof.

It has been shown that thin magnetic films which have a specific composition and fixed fabrication parameters can exhibit a large linear variation of $H_k$ under certain circumstances. For example, reference is made to the co-pending application entitled Magnetic Film Having Uniformly Variable $H_k$ And Method Therefor by Alfred A. Adomines and having the Ser. No. 271,300, having been filed on Apr. 8, 1963 and assigned to the common assignee of this application. In the referenced co-pending application, a method is described for producing a thin magnetic film which has a uniformly varying $H_k$ value along the length thereof. This type of thin magnetic film may be inserted at the layer 16 to provide a uniformly varying $H_k$ thin magnetic film in the transformer.

With a thin magnetic film exhibiting uniaxial anisotropy and having a variable $H_k$ inserted at layer 16, an electromagnetic wave propagating along the strip transmission line will experience a linearly changing permeability therealong as shown supra. Therefore, a uniform and linear change in the characteristic impedance of the transmission line results. By controlling the variation in the value of $H_k$, the variation in the value of $\mu_r$ may be controlled. As shown in the first equation supra, the controlled variation of $\mu_r$ permits a controlled variation in the impedance of the transformer. Therefore, the impedance value at different ends of the transformer may be different within reasonable ranges. Impedance transformations of 4:1 or 5:1 are recognized as being reasonably obtainable. It is contemplated that, with improved techniques and materials, transformation ratios of 50:1, or more, may be obtainable. In any event, it may be seen that transformations of impedance levels at the different ends of the transformer are clearly feasible and improvements may be made.

Referring now to FIGURE 2, there is shown a side view of another embodiment of this invention. In this embodiment, components which are similar to those shown in FIGURE 1 bear similar reference numerals. It will be seen that a slight modification has been made in the thin magnetic film and the adjacent dielectric. Otherwise, there are no changes in the devices. The new thin magnetic film is labeled **16*a* and the new dielectric is labeled 14*a* because of the modification. These components are similar to the components 14 and 16 of the embodiment shown in FIGURE 1 with the exception that the components 14*a* and 16*a* have slightly different physical configurations. That is, the thin magnetic film 16*a* has a tapered cross-section or side configuration. Therefore, one end thereof has a thickness, $T_1$, which may be on the order of 200 Angstroms and the other end thereof has a thickness, $T_2$, which may be on the order of 2,000 Angstroms. These figures are exemplary only and are not meant to limit the invention in any manner. The purpose of the tapered thin magnetic film 16*a* is to provide a variable value of $H_k$. That is, if thin magnetic films are produced of a fixed and specified composition by means of fixed fabrication techniques and parameters, a relatively large linear variation of $H_k$ is produced as a function of the film thickness. Thus, as the thickness of the film increases, the value of $H_k$ decreases. Therefore, the value of $H_k$ at the end of thin film 16*a* which has the greater thickness, $T_2$, is a smaller value than the value of $H_k$ at the end of thin film 16*a* having the smaller thickness $T_1$. Since the thickness of thin film 16*a*** varies linearly with distance along the transformer, the value of $H_k$ therealong also varies linearly. Thus, the transformer again provides a varying value of $H_k$ along the length thereof. This varying value of $H_k$ causes a varying value of $\mu_r$ which directly produces a variation in the impedance value of the transformer.

In this embodiment, the dielectric layer **14*a* is shown as having a tapered configuration. This configuration is shown as a preferred type of configuration wherein the thickness of the overall transformer is kept constant. It is to be understood, that a dielectric layer 14 which is not tapered may be substituted for the tapered layer 14*a*. That is, each of these layers comprises a similar type of material and the only distinction therebetween is the tapered configuration thereof. If the nontapered layer 14** was substituted, a slight tapered configuration of the transformer would result. However, this tapered configuration would be relatively indiscernable. That is, since the total thickness of the transformer may be on the order of several mils (for example 100 or more) while the amount of taper may be on the order of only one or two thousand Angstroms, or less, the difference in thickness at the two ends of the overall transformer is, relatively, imperceptible.

Methods for obtaining the variable thickness of thin film **16*a* are suggested. For example, the film 16*a* may be deposited upon a substrate 14*a* or 18 or the like in such a fashion that the substrate upon which the film 16*a* is deposited is slowly removed from the bath, or area, or the like where the deposition is taking place. Thus, certain areas of the substrate will be exposed to the depositing location for longer times wherein greater amounts of deposit will be made. The greater the amount of deposit, of course, the greater the thickness of the thin film 16*a***. Of course, the converse may be provided in that the substrate may be slowly covered wherein certain areas are receptive of the magnetizable material for longer periods of time. These are only some of the suggested methods for providing a thin magnetic film which has a varying thickness and therefore a varying $H_k$ along the length thereof.

The embodiments shown and described supra are presented as preferred embodiments of this invention. Other modifications may be suggested to those skilled in the art. These modifications are contemplated to be within the scope of this invention provided the inventive principles are followed. Any modifications which fall within this area of the art as defined are meant to be included within the claims which are appended hereto.

The embodiments of the invention in which an exclusive property or privilege is claimed are defined as follows:

I claim:

1. An impedance transformer comprising, first and second conductors, a thin magnetic film having a varying thickness disposed between said first and second conductors, and an insulating layer disposed between said magnetic film and at least one of said first and second conductors, said thin magnetic film being characterized by a linearly varying value of $H_k$.

2. In an impedance transformer having a linearly varying impedance between the terminals thereof, a pair of electrical conductors, said pair of conductors forming a transmission line, a varying thickness layer of magnetic material exhibiting uniaxial anisotropy and linearly varying value of $H_k$, said magnetic layer being disposed between said pair of electrical conductors thereby to vary the characteristic impedance of said transmission line, and at least one insulating layer disposed between said magnetic layer and at least one of said pair of electrical conductors.

3. The impedance transformer of claim 2, wherein said layer of magnetic material has a uniformly varying thickness along the length thereof, and said insulating layer has a uniformly varying width and complements said layer of magnetic material.

4. An impedance transformer comprising, first and second conductors, one of said conductors affixed to a substrate base for mechanical support, a thin magnetic film having a varying thickness disposed between said first and second conductors, and an insulating layer disposed between said magnetic film and at least one of said first and second conductors, said thin magnetic film being characterized by a linearly varying value of $H_k$ such that permeability thereof varies.

5. In an impedance transformer having a linearly varying impedance between the terminals thereof, a pair of electrical conductors, said pair of conductors forming a transmission line, a layer of magnetic material exhibiting uniaxial anisotropy and a linearly varying value of $H_k$, said magnetic layer being disposed between said pair of electrical conductors thereby to vary the characteristic impedance of said transmission line by varying the permeability of the layer, and at least one insulating layer disposed between said magnetic layer and at least one of said pair of electircal conductors.

6. The impedance transformer of claim 5, wherein said layer of magnetic material has a linearly varying thickness along the length thereof.

References Cited

UNITED STATES PATENTS

| | | | |
|---|---|---|---|
| 2,508,479 | 5/1950 | Wheeler | 333—96 |
| 2,774,046 | 12/1956 | Arditi | 333—84 |
| 2,787,656 | 4/1957 | Raisbeck | 333—96 |
| 2,825,876 | 4/1958 | LeVine et al. | 333—84 |
| 2,867,782 | 1/1959 | Arditi | 333—34 |
| 2,939,092 | 5/1960 | Cook | 333—34 |
| 3,141,145 | 7/1964 | Barrett | 333—79 |
| 3,191,132 | 6/1965 | Mayer | 333—79 |
| 3,257,629 | 6/1966 | Kornreich | 333—31 |
| 3,305,380 | 2/1967 | Adomines | 117—7 |

OTHER REFERENCES

Article: "Small UHF Ferrite Unit Shifts Phase," Electronics, Aug. 15, 1958, p. 102, 333–84M.

Dietrich & Probster: "Measuring Switching Speed of Magnetic Films," Electronics, June 3, 1960, pp. 79 to 81.

HERMAN KARL SAALBACH, *Primary Examiner.*

C. BARAFF, *Assistant Examiner.*